(12) United States Patent
Chung

(10) Patent No.: US 6,929,029 B1
(45) Date of Patent: Aug. 16, 2005

(54) FAUCET FOR PREVENTING COLD WATER FROM FLOWING TO HOT WATER TUBE

(76) Inventor: Chiu Chih Chung, 235 Chung-Ho Box 8-24, Taipei (TW)

( * ) Notice: Subject to any disclaimer, the term of this patent is extended or adjusted under 35 U.S.C. 154(b) by 77 days.

(21) Appl. No.: 10/872,004

(22) Filed: Jun. 21, 2004

(51) Int. Cl.⁷ .............................................. E03B 1/00
(52) U.S. Cl. .............................. 137/614.2; 137/454.6; 137/854
(58) Field of Search .................... 137/614.2, 454.5, 137/454.6, 852, 854, 855

(56) References Cited

U.S. PATENT DOCUMENTS

| | | | | |
|---|---|---|---|---|
| 4,570,899 A | * | 2/1986 | Kingham | 251/51 |
| 5,329,957 A | * | 7/1994 | Semchuck et al. | 137/218 |
| 5,355,906 A | * | 10/1994 | Marty et al. | 137/454.6 |
| 5,996,614 A | * | 12/1999 | Ashton | 137/614.2 |

* cited by examiner

Primary Examiner—Kevin Lee

(57) ABSTRACT

A water control valve of a faucet comprises a water control body; a water-stop ring having a water outlet slot; a water guiding disk having a round shape; a lateral surface of the water guiding disk being formed with a protrusion for resisting against a lower annular surface of the water control body; a water inlet seat being at a lowest end of the water-control valve; the water inlet seat having a recess; a through hole being formed in a center of the recess and a plurality of water inlets being positioned around the through hole; and a water-stop unit having a base and a tapered rod extends from a center of the base; the base resisting against a bottom of the recess and located upon the plurality of water inlets; and an annular flange being formed on the tapered rod near the base.

1 Claim, 4 Drawing Sheets

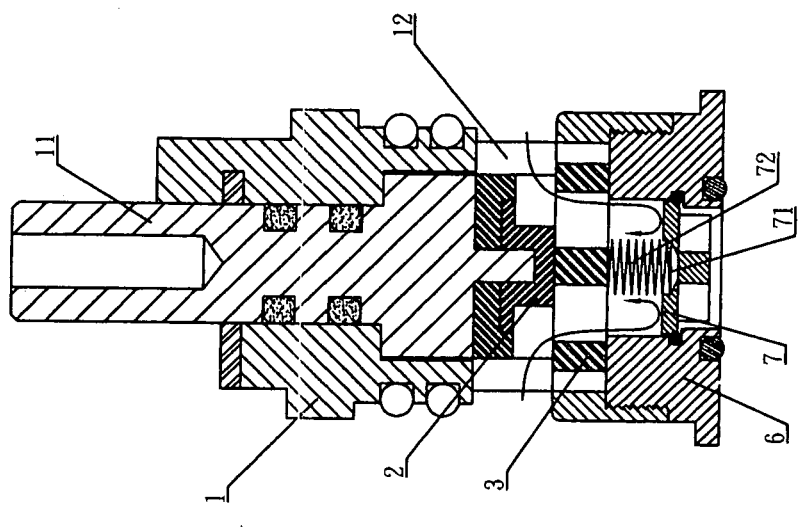
Fig. 1-B (Prior Art)
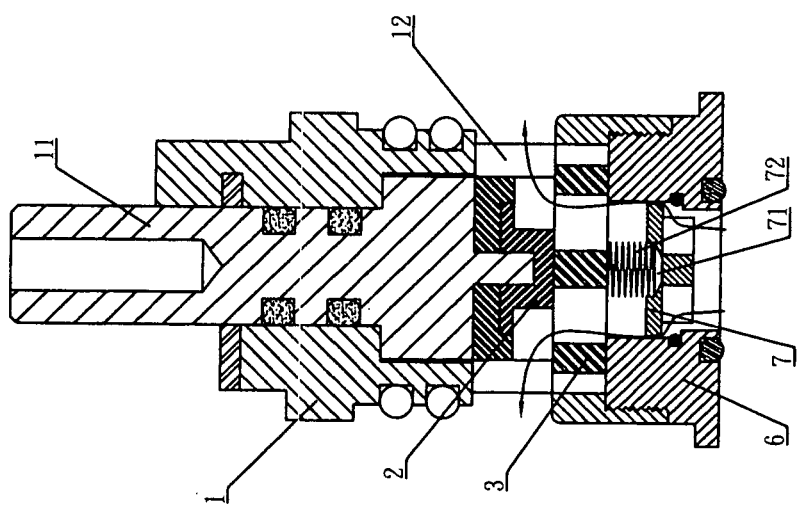
Fig. 1-A (Prior Art)

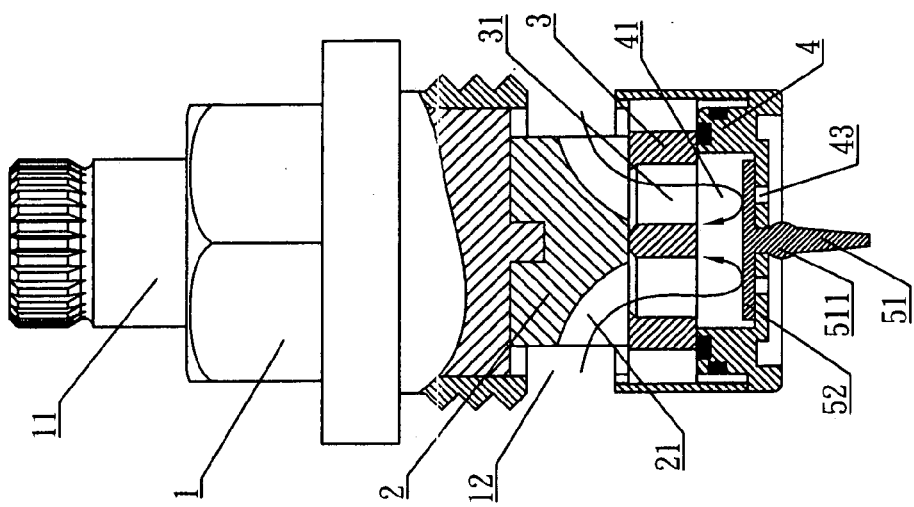
Fig. 4-A
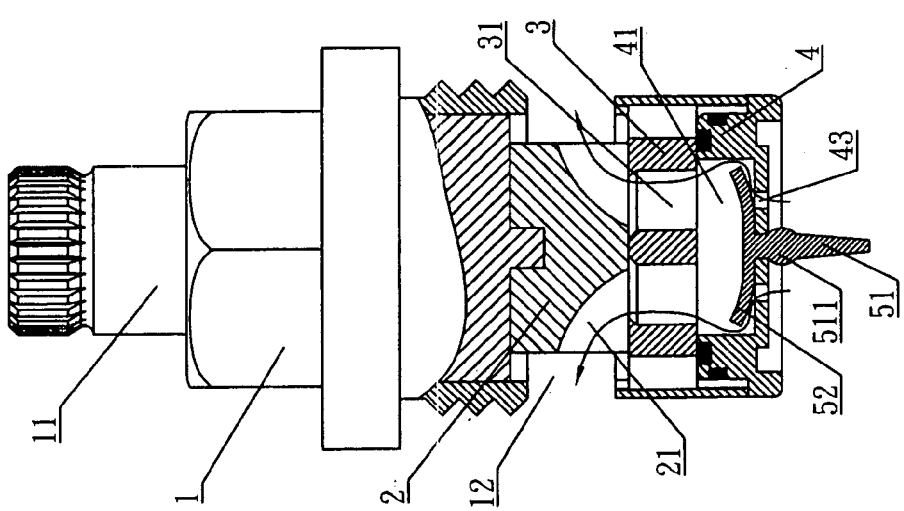
Fig. 4-B

FAUCET FOR PREVENTING COLD WATER FROM FLOWING TO HOT WATER TUBE

BACKGROUND OF THE INVENTION

1) Field of the Invention

The present invention relates to faucets, and particular to a faucet for preventing cold water from flowing to the hot water tube, wherein the ratio of hot water and cold water is controllable.

2) Description of the Prior Art

Since hot water flow path is longer than that of cold water, pressure of cold water is larger than that of hot water. Thereby, cold water will flow to the hot water inlet so that the gas for warming the hot water will not burn completely. As a result, carbon monoxide will drain out or gas explosion occurs.

Referring to FIGS. 1A and 1B, a convention faucet is illustrated. The prior art faucet includes a water control body 1 with a rotatable control rod 11 at a center thereof, a water stop ring 2 at a lower end of the rotatable control rod 11 and rotatable synchronously with the rotatable control rod 11; a wire guiding ring 3 buckling an inner annular surface of the water control body 1; and a check structure below the wire guiding ring 3. The check structure has a water inlet thread sleeve 6. A positioning disk 7 with a confining groove 71 at a top thereof is installed within the sleeve 6. A weak spring 72 is installed in the confining groove 71. After the sleeve 6 is locked in the water control body 1, the weak spring 72 is compressed slightly so as to be formed with a buffer space. When the cool and hot water are mixed, the waterflow will compress the weak spring 72 in advance, and then the water flows into the outlet end from the water outlet 12 of the water control body 1, see FIG. 1A. When the pressure of cold water is larger than that of hot water, the pressure of cold water will push the positioning disk 7 to move downwards. By the resilient force of the weak spring 72, the lower end of the sleeve 6 is sealed to prevent the cold water from returning to the check structure. However, the structure of this prior art is complicated so that the cost in assembly is high. Furthermore, since the spring may fatigue, the lifetime will shorten. Thereby, after the faucet is used for a time period, it is possible that cold water can not be sealed effective.

SUMMARY OF THE INVENTION

Accordingly, the primary object of the present invention is to provide a water control valve of a faucet which comprises a water control body; a water-stop ring having a water outlet slot; a water guiding disk having a round shape; a lateral surface of the water guiding disk being formed with a protrusion for resisting against a lower annular surface of the water control body; a water inlet seat being at a lowest end of the water-control valve; the water inlet seat having a recess; a through hole being formed in a center of the recess and a plurality of water inlets being positioned around the through hole; and a water-stop unit having a base and a tapered rod extends from a center of the base; the base resisting against a bottom of the recess and locating upon the plurality of water inlets; an annular flange being formed on the tapered rod near the base.

The various objects and advantages of the present invention will be more readily understood from the following detailed description when read in conjunction with the appended drawing.

BRIEF DESCRIPTION OF THE DRAWINGS

FIG. 1A is a plane schematic view about the normal flow of the water of a faucet in the prior art.

FIG. 1B is a plane schematic view showing the returning flow of water in a faucet according to the prior art.

FIG. 4A is a plane schematic view showing the normal flow of the water in a faucet of the present invention.

FIG. 4B is a plane schematic view showing the returning flow of water in a faucet of the present invention.

DETAILED DESCRIPTION OF THE INVENTION

Figure 2:
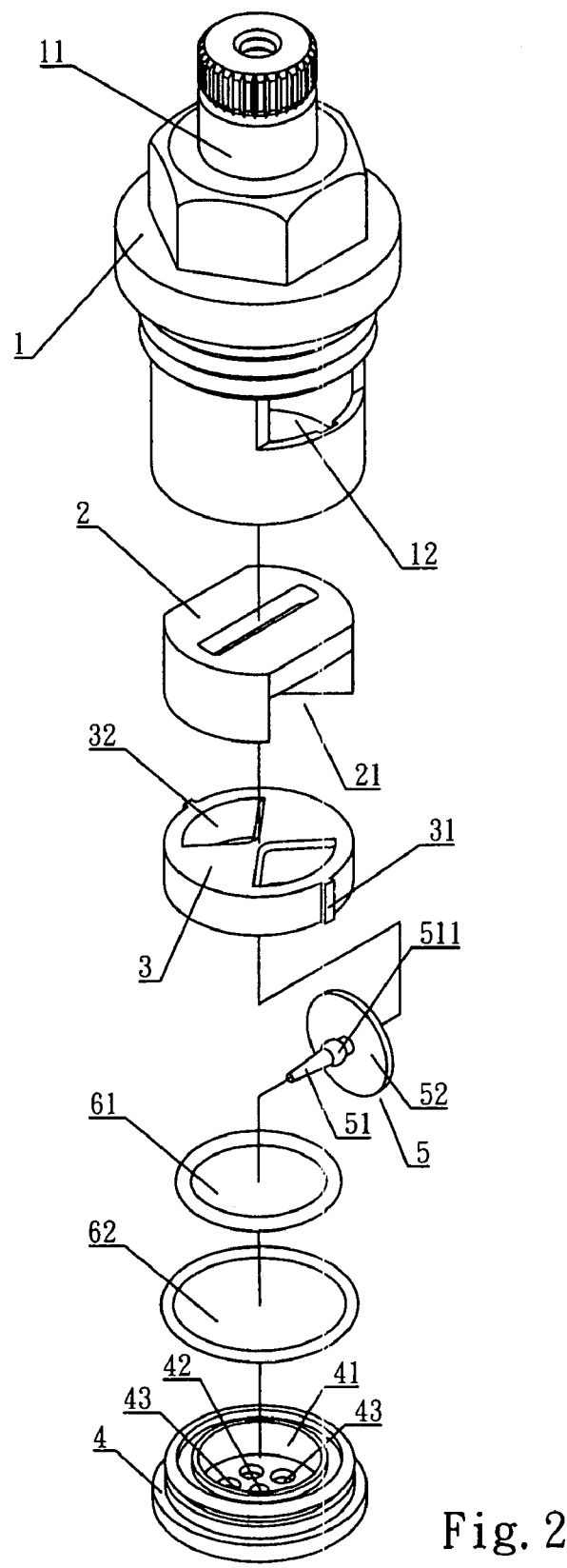
FIG. 2 is an exploded perspective view of the present invention.
Figure 3:
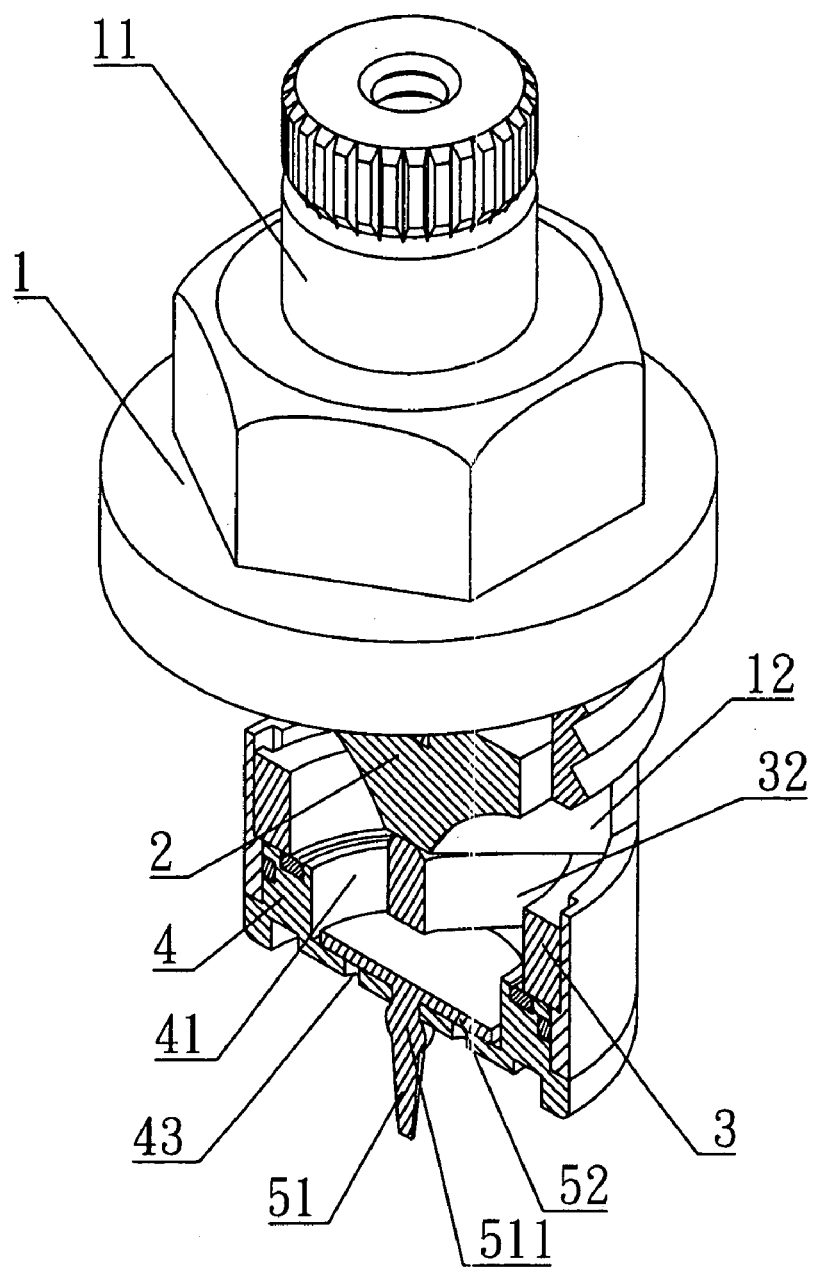
FIG. 3 is an assembled perspective view of the present invention.

Referring to FIG. 2 and FIG. 3, the structural arrangement of the invention herein is illustrated. The present invention comprises the following components.

A water control body 1 is included. A water-stop ring 2, a flow guide ring 3 and a water inlet seat 4 are sequentially installed at a lower end of the water control body 1. A lower end of the water control body 1 is installed with a water outlet 12 at a lateral side of the water control body 1.

A rotatable control rod 11 is at a center of the water control body 1. A lower end of the rotatable control rod 11 is buckled to the water-stop ring 2 for driving the water-stop ring 2 to rotate synchronously. The water-stop ring 2 has a water outlet slot 21 at a lower side thereof. As the water outlet slot 21 is aligned to the water outlet 12, a flow path is formed.

A water guiding disk 3 has a round shape. A lateral surface of the water guiding disk 3 is formed with a protrusion 31 which can resist against a lower annular surface of the water control body 1. Two sector water guiding holes 32 are formed on the water guiding disk 3. The water guiding holes 32 is communicable to the water outlet slot 21 of the water-stop ring 2.

A water inlet seat 4 is at a lowest end of the present invention. A top center of the water inlet seat 4 has a recess 41. A through hole 42 is formed in a center of the recess 41 and a plurality of water inlets 43 penetrate the recess 42 and are positioned around the through hole 42. Two washers 61, 62 are arranged around an outer periphery of the water inlet seat 4 for tightly arranging the water inlet seat 4.

A water-stop unit 5 made of rubber passes through the through hole 42. The water-stop unit 5 has a base 52 and a tapered rod 51 extends from a center of the base 52. The base 52 resists against a bottom of the recess 41 and upon the plurality of water inlets 43. An annular flange 511 is formed on the tapered rod 51 near the base 52 for tightly resisting against the through holes 42 so that the water-stop unit 5 can be positioned upon the water inlet seat 4.

The operation of the present invention will be described herein with reference to FIGS. 4A and 4B. When the cold water and hot water are to be used at the same time, water flows into a bottom end of the water inlet seat 4 and then eject the base 52 upon the water inlets 43. Then the base 52 will move upwards so that water flows into the water control body 1. Then the water flows into a faucet from the water outlet 12, see FIG. 3A. When the pressure of cold water is greater than that of hot water so that the cold water returns to the water control body 1 having hot water. The pressure of the cold water will press the base 52 of the water-stop unit 5 so that the water-stop unit 5 are adhered upon the top of the water inlets 43, see FIG. 3B. The greater the pressure of cold water, the tightness of the sealing between the base 52 and the water inlets 43. Thereby, the cold water will not return to mix the hot water so as to induce incompleteness of burning or air explosion.

Thereby, in the present invention, by using the water control body, the water inlet seat and water-stop unit, the object of preventing cold water from returning is achieved. Thereby, the assembly of the present invention is easy. Moreover, the lifetime of the water-stop unit made of rubber is longer than that of prior art springs. Thus the lifetime of faucet is prolonged.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A water control valve of a faucet comprising:
   a water control body having a water-stop ring, and a flow guide ring which are sequentially installed at a lower end of the water control body; a lower end of the water control body being installed with a water outlet at a lateral side of the water control body;
   a rotatable control rod at a center of the water control body; a lower end of the rotatable control rod being buckled to the water-stop ring for driving the water-stop ring to rotate synchronously; the water-stop ring having a water outlet slot at a lower side thereof; as the water outlet slot being aligned to the water outlet, a flow path being formed;
   a water guiding disk having a round shape; a lateral surface of the water guiding disk being formed with a protrusion for resisting against a lower annular surface of the water control body; two sector water guiding holes being formed on the water guiding disk; the water guiding holes being communicable to the water outlet slot of the water-stop ring;
   a water inlet seat being at a lowest end of the water-control valve; a top center of the water inlet seat having a recess; a through hole being formed in a center of the recess and a plurality of water inlets penetrating through the recess and being positioned around the through hole;
   two washers arranged around an outer periphery of the water inlet seat; and
   a water-stop unit made of rubber passing through the through hole;
   the water-stop unit having a base and a tapered rod extending from a center of the base; the base resisting against a bottom of the recess and locating upon the plurality of water inlets; an annular flange being formed on the tapered rod near the base for tightly resisting against the through holes so that the water-stop unit can be positioned upon the water inlet seat.

* * * * *